US012566350B2

(12) United States Patent
Wu et al.

(10) Patent No.: US 12,566,350 B2
(45) Date of Patent: Mar. 3, 2026

(54) DISPLAY PANEL

(71) Applicant: AUO Corporation, Hsinchu City (TW)

(72) Inventors: Chia-Jung Wu, Hsinchu City (TW);
Yueh-Chi Wu, Hsinchu City (TW);
Ti-Kuei Yu, Hsinchu City (TW);
Ya-Ling Hsu, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 0 days.

(21) Appl. No.: 18/909,977

(22) Filed: Oct. 9, 2024

(65) Prior Publication Data

US 2025/0298272 A1 Sep. 25, 2025

(30) Foreign Application Priority Data

Mar. 19, 2024 (TW) ................................. 113110203

(51) Int. Cl.
*G02F 1/1339* (2006.01)
*G02F 1/1333* (2006.01)
(52) U.S. Cl.
CPC ........ *G02F 1/1339* (2013.01); *G02F 1/13336* (2013.01)
(58) Field of Classification Search
CPC ............................ G02F 1/1339; G02F 1/13336
See application file for complete search history.

(56) References Cited

U.S. PATENT DOCUMENTS

| | | | |
|---|---|---|---|
| 2017/0059906 A1 | 3/2017 | Cho et al. | |
| 2023/0057812 A1* | 2/2023 | Zheng | C09J 11/04 |
| 2024/0046824 A1 | 2/2024 | Luo | |
| 2024/0126111 A1 | 4/2024 | Zhou et al. | |
| 2024/0160062 A1* | 5/2024 | Sun | G02F 1/133528 |

FOREIGN PATENT DOCUMENTS

| | | |
|---|---|---|
| CN | 113281928 A | 8/2021 |
| KR | 20170025816 A | 3/2017 |

* cited by examiner

*Primary Examiner* — Lucy P Chien
(74) *Attorney, Agent, or Firm* — WPAT, PC

(57) ABSTRACT

A display panel includes a first substrate, a second substrate, a first sealing glue layer, a second sealing glue layer and a liquid crystal layer. The first substrate has a first display area and a second display area, in which a plurality of light-emitting diodes (LEDs) are disposed in the second display area. The second display area surrounds the first display area and has a first edge, a second edge, a third edge and a fourth edge. The second substrate is located on the first substrate. The first sealing glue layer has a first portion, in which the first sealing glue layer includes fiber and the first sealing glue layer is at least adjacent to the first edge. The second sealing layer has a first portion, in which the second sealing glue layer covers the LEDs.

15 Claims, 13 Drawing Sheets

120(120a)

150

DISPLAY PANEL

RELATED APPLICATIONS

This application claims priority to Taiwan Application Serial Number 113110203, filed Mar. 19, 2024, which is herein incorporated by reference.

BACKGROUND

Field of Invention

The present disclosure relates to a display panel.

Description of Related Art

In the field of large scale display, splicing screen is generally used to achieve large scale display. However, although the boarder of traditional bistable liquid crystal display is already extremely narrow, when multiple liquid crystal display are spliced, the gap of splicing is still visible, which cause the distortion of the image.

A general solution of this is to add micro light-emitting diode (μLED) on the boarder of the liquid crystal display, such that the boarder can also display image to achieve the effect of the continuity of image. However, such design will lead to the difference between the terrain height of the three edges with μLED and the terrain height of the edge without μLED, which is unable to seal the liquid crystal in the center of the liquid crystal display in a single process and causes technical problems.

SUMMARY

One aspect of the present disclosure provides a display panel.

According to one embodiment of the present disclosure, a display panel includes a first substrate, a second substrate, a first sealing glue layer, a second sealing glue layer and a liquid crystal layer. The first substrate has a first display area and a second display area, in which a plurality of light-emitting diodes (LEDs) are disposed in the second display area. The second display area surrounds the first display area and has a first edge, a second edge, a third edge and a fourth edge. The second substrate is located on the first substrate. The first sealing glue layer is located between the first substrate and the second substrate and in the second display area and has a first portion, in which the first sealing glue layer includes fiber and the first sealing glue layer is at least adjacent to the first edge. The second sealing glue layer is located between the first substrate and the second substrate and in the second display area and has a first portion, in which the second sealing glue layer covers the LEDs. The liquid crystal layer is located between the first substrate and the second substrate and surrounded by the first sealing glue layer and the second sealing glue layer.

In some embodiment of the present disclosure, the second sealing glue layer further includes a second portion adjacent to the first edge.

In some embodiment of the present disclosure, the second portion of the second sealing glue layer is located at a side of the first sealing glue layer facing away the first display area.

In some embodiment of the present disclosure, a height of the first portion of the first sealing glue layer is different from a height of the second portion of the second sealing glue layer.

In some embodiment of the present disclosure, the second sealing glue layer further includes a third portion adjacent to the third edge.

In some embodiment of the present disclosure, the first sealing glue layer further includes a second portion adjacent to the third edge.

In some embodiment of the present disclosure, the first sealing glue layer is located between the first display area and a third portion of the second sealing glue layer.

In some embodiment of the present disclosure, the first sealing glue layer further includes a third portion adjacent to the second edge or the fourth edge.

In some embodiment of the present disclosure, the first sealing glue layer is adjacent to a bonding area.

In some embodiment of the present disclosure, the second sealing glue layer includes fiber, and a size of the fiber of the first sealing glue layer is greater than a size of the fiber of the second sealing glue layer.

Another aspect of the present disclosure provides a display panel.

According to one embodiment of the present disclosure, a display panel includes a substrate, a first sealing glue layer, a second sealing glue layer, a liquid crystal layer and a bonding area. The substrate has a first display area and a second display area, in which a plurality of light-emitting diodes (LEDs) are disposed in the second display area. The second display area surrounds the first display area and has a first edge, a second edge, a third edge and a fourth edge. The first sealing glue layer is located on the substrate and in the second display area and has a first portion, in which the first sealing glue layer includes fiber and the first sealing glue layer is at least adjacent to the first edge. The second sealing glue layer is located on the substrate and in the second display area and has a first portion, in which the second sealing glue layer covers the LEDs. The liquid crystal layer is located on the substrate and surrounded by the first sealing glue layer and the second sealing glue layer. The bonding area is adjacent to the first edge of the substrate.

In some embodiment of the present disclosure, the second sealing glue layer further includes a second portion adjacent to the first edge.

In some embodiment of the present disclosure, the second portion of the second sealing glue layer is located at a side of the first sealing glue layer facing away the first display area.

In some embodiment of the present disclosure, a height of the first portion of the first sealing glue layer is different from a height of the second portion of the second sealing glue layer.

In some embodiment of the present disclosure, the second sealing glue layer further includes a third portion adjacent to the third edge.

In the aforementioned embodiments of the present disclosure, since the first sealing glue layer is disposed on the first edge of the second display area without LED to fill the terrain height of the LEDs. Such that when coating the second sealing glue layer thereafter, the second sealing glue layer can properly seal the liquid crystal layer in the middle and can keep the size of the gap between the first substrate and the second substrate, which maintains the stability of the process.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
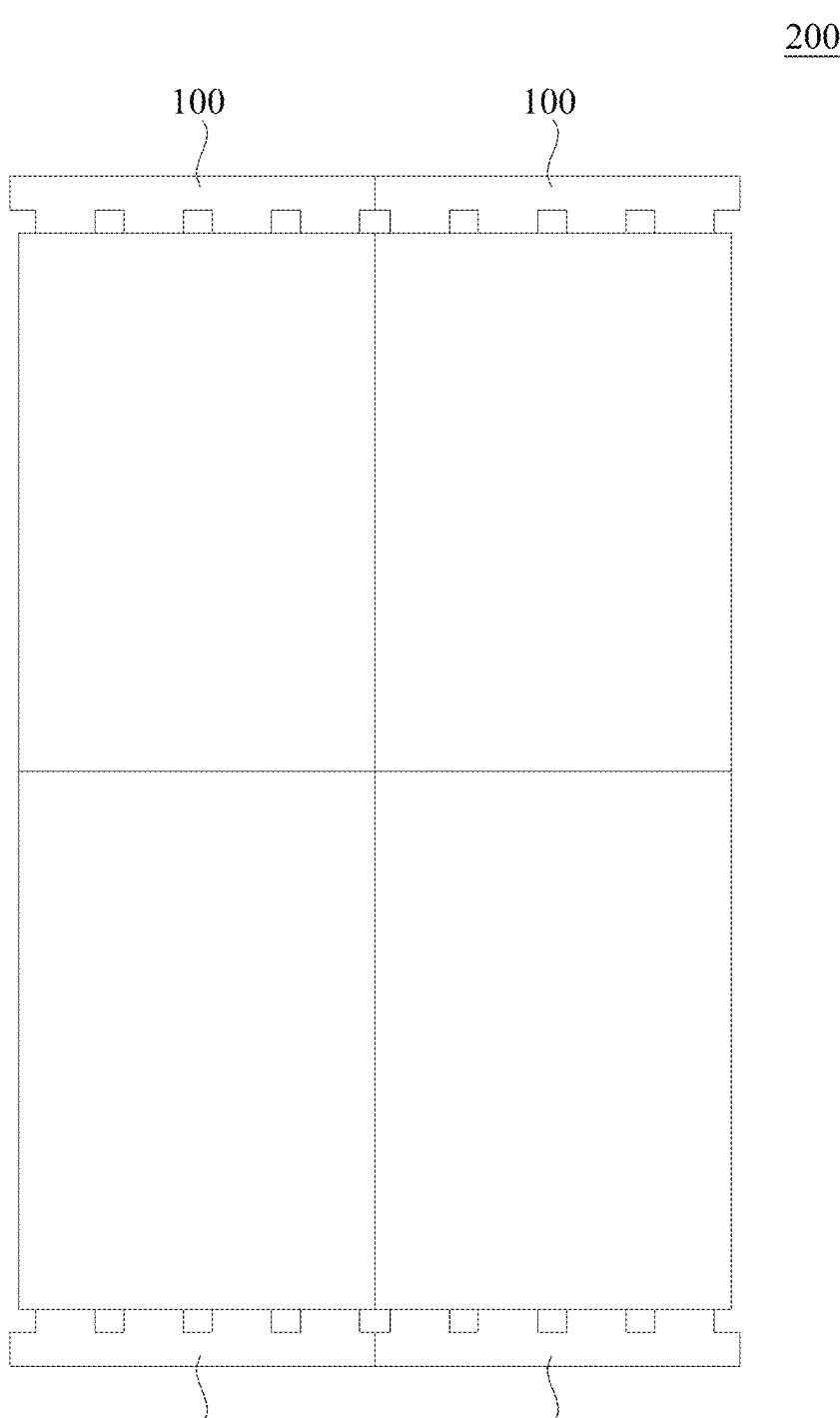
FIG. 1 is a top view of a spliced display according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The term "about," "approximately," or "substantially" as used herein is inclusive of the stated value and means within an acceptable range of deviation for the particular value as determined by persons of ordinary skill in the art, conedgering the measurement in question and the error associated with measurement of the particular quantity (i.e., the limitations of the measurement system). For example, "about" may mean within one or more standard deviations, or within, for example, ±30%, ±20%, ±15%, ±10%, ±5% of the stated value. Moreover, a relatively acceptable range of deviation or standard deviation may be chosen for the term "about," "approximately," or "substantially" as used herein based on optical properties, etching properties or other properties, instead of applying one standard deviation across all the properties.

Figure 2:
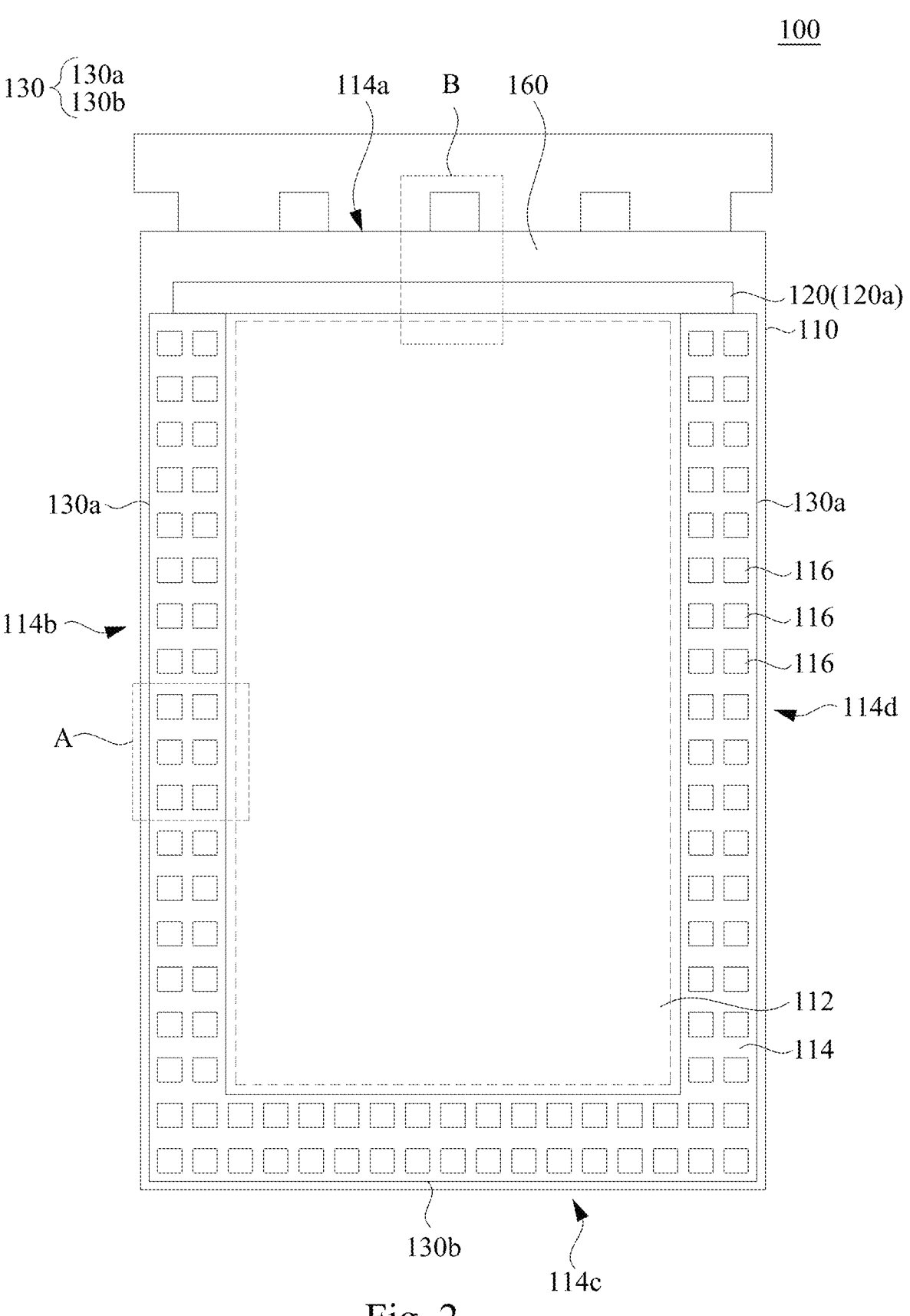
FIG. 2 is a top view of a display panel according to one embodiment of the present disclosure.

FIG. 1 is a top view of a spliced display 200 according to one embodiment of the present disclosure. FIG. 2 is a top view of a display panel 100 according to one embodiment of the present disclosure. Refer to FIG. 1 and FIG. 2, the display panel 100 can be one of the display panels of the spliced display 200. The display panel 100 includes a first substrate 110. To clearly express the configuration of the elements of the first substrate 110, the second substrate 150 (see FIG. 4) is omitted in FIG. 2. The first substrate 110 has a first display area 112 and a second display area 114, in which a plurality of light-emitting diodes (LEDs) 116 are disposed in the second display area 114. The second display area 114 surrounds the first display area 112 and has a first edge 114a, a second edge 114b, a third edge 114c and a fourth edge 114d. The display panel further includes a bonding area 160. In the present embodiment, the bonding area 160 is adjacent to the first edge 114a of the second display area 114. Aside from the first edge 114a of the second display area 114 that the bonding area 160 is adjacent to, the three other edges (i.e. the second edge 114b, the third edge 114c and the fourth edge 114d of the second display area 114) will splice with other display panel. Thus, LEDs 116 are disposed in the second edge 114b, the third edge 114c and the fourth edge 114d of the second display area 114. In the following description, a single display panel 100 is described.

Figure 3:
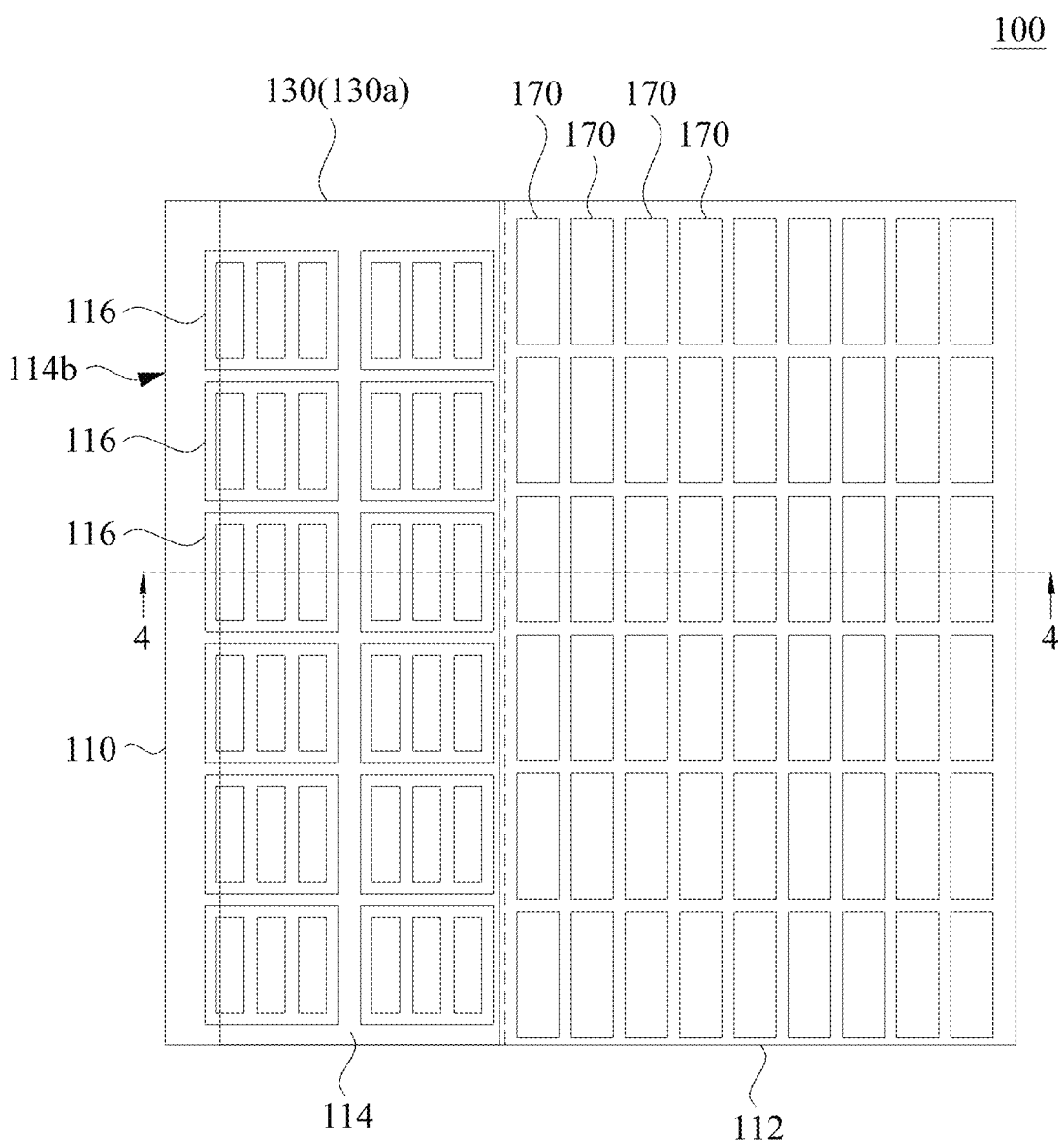
FIG. 3 is a local enlarged view of a range confined by the dash lines A of a display panel according to one embodiment of the present disclosure.
Figure 4:
FIG. 4 is a cross section view of the display panel of FIG. 3 along line segment 4-4.

FIG. 3 is a local enlarged view of a range confined by the dash lines A of a display panel 100 according to one embodiment of the present disclosure. FIG. 4 is a cross section view of the display panel 100 of FIG. 3 along line segment 4-4. Refer to FIG. 3 and FIG. 4, using the second edge 114b of the second display area 114 of the display panel 100 as an example, the display panel 100 further includes a second substrate 150 and a second sealing glue layer 130. The second substrate 150 is located on the first substrate 110. The second sealing glue layer 130 is located between the first substrate 110 and the second substrate 150 and in the second display area 114 and has a first portion 130a and a second portion 130b (see FIG. 2), in which the first portion 130a of the second sealing glue layer 130 covers the LEDs 116. The liquid crystal layer is located between the first substrate 110 and the second substrate 150. The display panel 100 further includes a plurality of liquid crystal pixels 170. The liquid crystal pixels 170 are located in the first display area 112 of the first substrate 110.

Figure 5:
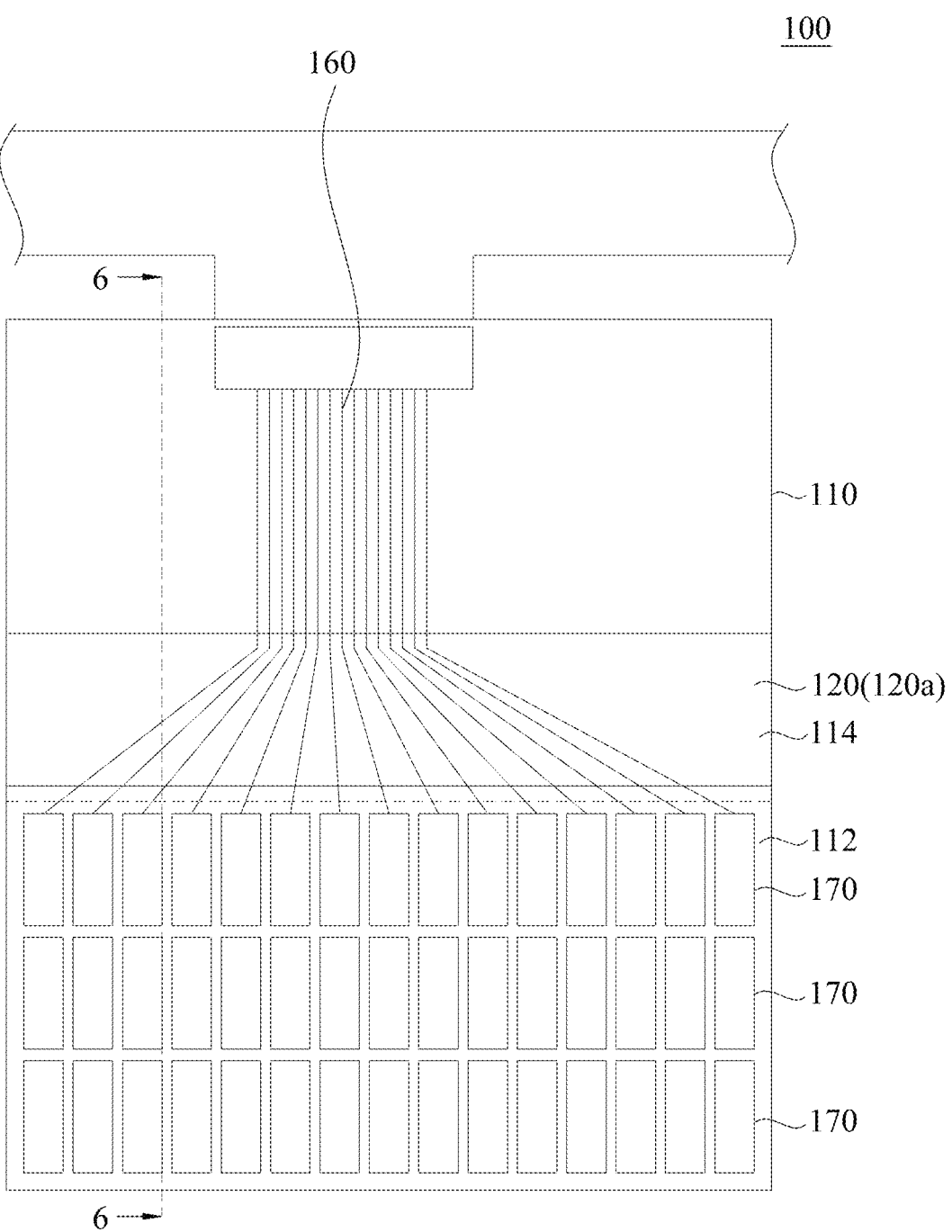
FIG. 5 is a local enlarged view of a range confined by the dash lines B of a display panel according to one embodiment of the present disclosure.
Figure 6:
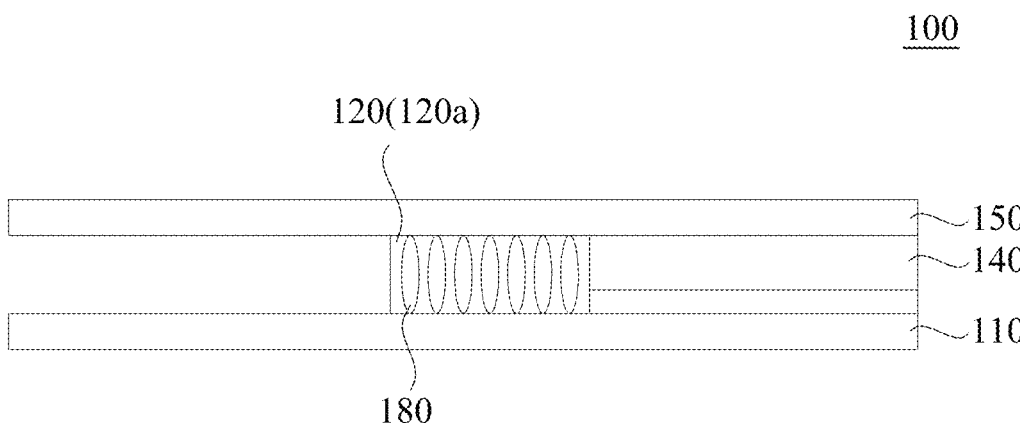
FIG. 6 is a cross section view of the display panel of FIG. 5 along line segment 6-6.

FIG. 5 is a local enlarged view of a range confined by the dash lines B of a display panel 100 according to one embodiment of the present disclosure. FIG. 6 is a cross section view of the display panel 100 of FIG. 5 along line segment 6-6. Refer to FIG. 5 and FIG. 6, the display panel 100 further includes a first sealing glue layer 120. The first sealing glue layer 120 is located between the first substrate 110 and the second substrate 150 and in the second display area 114 and has a first portion 120a (can also see FIG. 2), in which the first sealing glue layer 120 includes fiber and the first sealing glue layer 120 is at least adjacent to the first edge 114a. Moreover, the first sealing glue layer 120 is adjacent to the bonding area 160. Such design can utilize the first sealing glue layer 120 to fill the scarcity of the convex terrain at the first edge 114a of the second display area 114 without disposing the LEDs 116. In the process sealing the liquid crystal layer 140 thereafter, the design can keep the gap between the first substrate 110 and the second substrate 150 remains the same without offsetting caused by the scarcity of the convex terrain at the first edge 114*a* of the second display area 114 without disposing the LEDs 116.

Since the first sealing glue layer 120 is disposed on the first edge 114*a* of the second display area 114 without LED 116 to fill the terrain height of the LEDs 116. Such that when coating the second sealing glue layer 130 thereafter, the second sealing glue layer 130 can properly seal the liquid crystal layer 140 in the middle and can keep the size of the gap between the first substrate 110 and the second substrate 150, which maintains the stability of the process.

Figure 7:
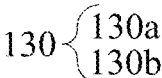
FIG. 7 is a top view of the first substrate of the display panel of FIG. 2 when manufacturing.
Figure 8:
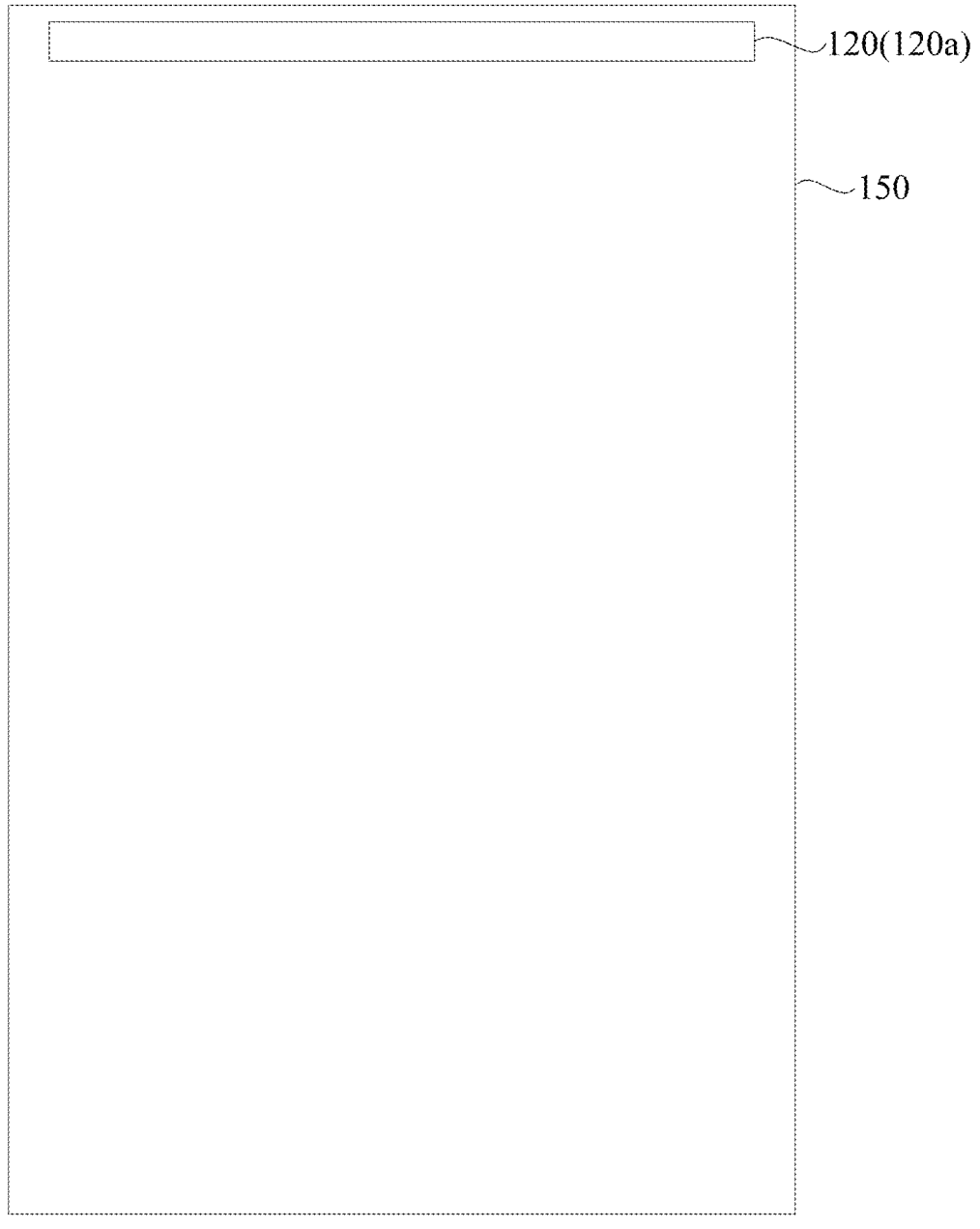
FIG. 8 is a top view of the second substrate of the display panel of FIG. 2 when manufacturing.

FIG. 7 is a top view of the first substrate 110 of the display panel 100 of FIG. 2 when manufacturing. FIG. 8 is a top view of the second substrate 150 of the display panel 100 of FIG. 2 when manufacturing. Refer to FIG. 7 and FIG. 8, in real manufacturing, two different kinds of sealing glue layers (i.e. the first sealing glue layer 120 and the second sealing glue layer 130) will be applied to the second substrate 150 and the first substrate 110 respectively. At this time, the LEDs 116, the liquid crystal pixels and the control circuits (not shown in the figure) are already disposed on the first substrate 110. Thereafter, attach the first substrate 110 to the second substrate 150. To achieve a better sealing effect to seal the liquid crystal layer in-between (see FIG. 3 or FIG. 5), the intersection portion of the first sealing glue layer 120 and the second sealing glue layer 130 can partially overlap.

Figure 9:
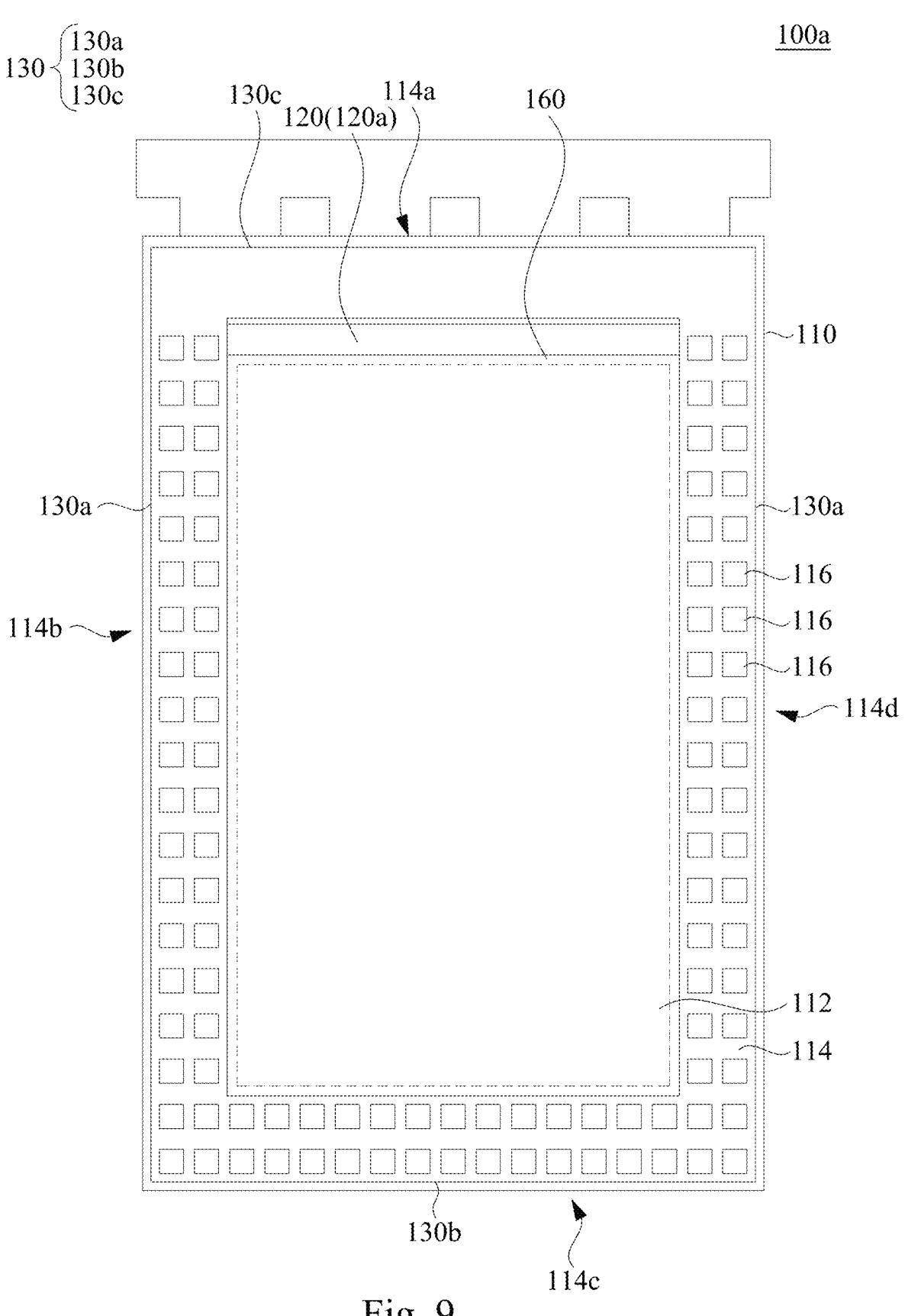
FIG. 9 is a top view of a display panel according to another embodiment of the present disclosure.

FIG. 9 is a top view of a display panel 100*a* according to another embodiment of the present disclosure. Refer to FIG. 9, a display panel 100*a* includes a first substrate 110, a first sealing glue layer 120 and a second sealing glue layer 130. The first substrate 110 has a first display area 112 and a second display area 114, in which a plurality of light-emitting diodes (LEDs) 116 are disposed in the second display area 114. The second display area 114 surrounds the first display area 112 and has a first edge 114*a*, a second edge 114*b*, a third edge 114*c* and a fourth edge 114*d*. The difference between the present embodiment and the embodiment of FIG. 1 is that, in the present embodiment, the second sealing glue layer 130 of the display panel 100*a* further includes a third portion 130*c* adjacent to the first edge 114*a*, and the third portion 130*c* of the second sealing glue layer 130 is located at a side of the first sealing glue layer 120 facing away the first display area 112. That is, the first portion 120*a* of the first sealing glue layer 120 is located between the first display area 112 and the third portion 130*c* of the second sealing glue layer 130.

Figure 10:
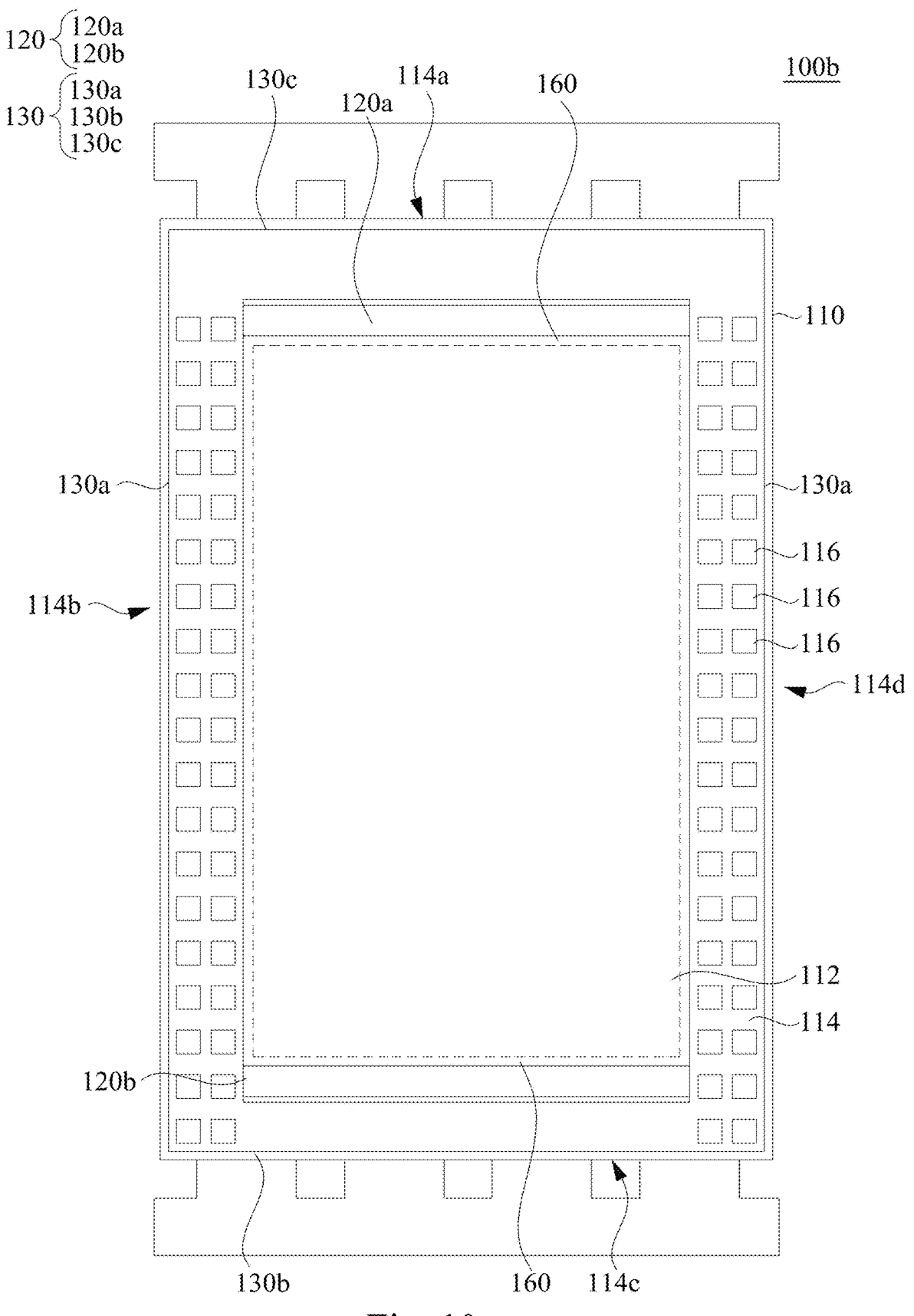
FIG. 10 is a top view of a display panel according to yet another embodiment of the present disclosure.

FIG. 10 is a top view of a display panel 100*b* according to yet another embodiment of the present disclosure. Refer to FIG. 10, a display panel 100*b* includes a first substrate 110, a first sealing glue layer 120 and a second sealing glue layer 130. The first substrate 110 has a first display area 112 and a second display area 114, in which a plurality of light-emitting diodes (LEDs) 116 are disposed in the second display area 114. The second display area 114 surrounds the first display area 112 and has a first edge 114*a*, a second edge 114*b*, a third edge 114*c* and a fourth edge 114*d*. The difference between the present embodiment and the embodiment of FIG. 8 is that, in the present embodiment, the first sealing glue layer 120 of the display panel 100*b* further includes a second portion 120*b* adjacent to the third edge 114*c*, and the second portion 120*b* of the first sealing glue layer 120 is located between the first display area 112 and the second portion 130*b* of the second sealing glue layer 130.

Figure 11:
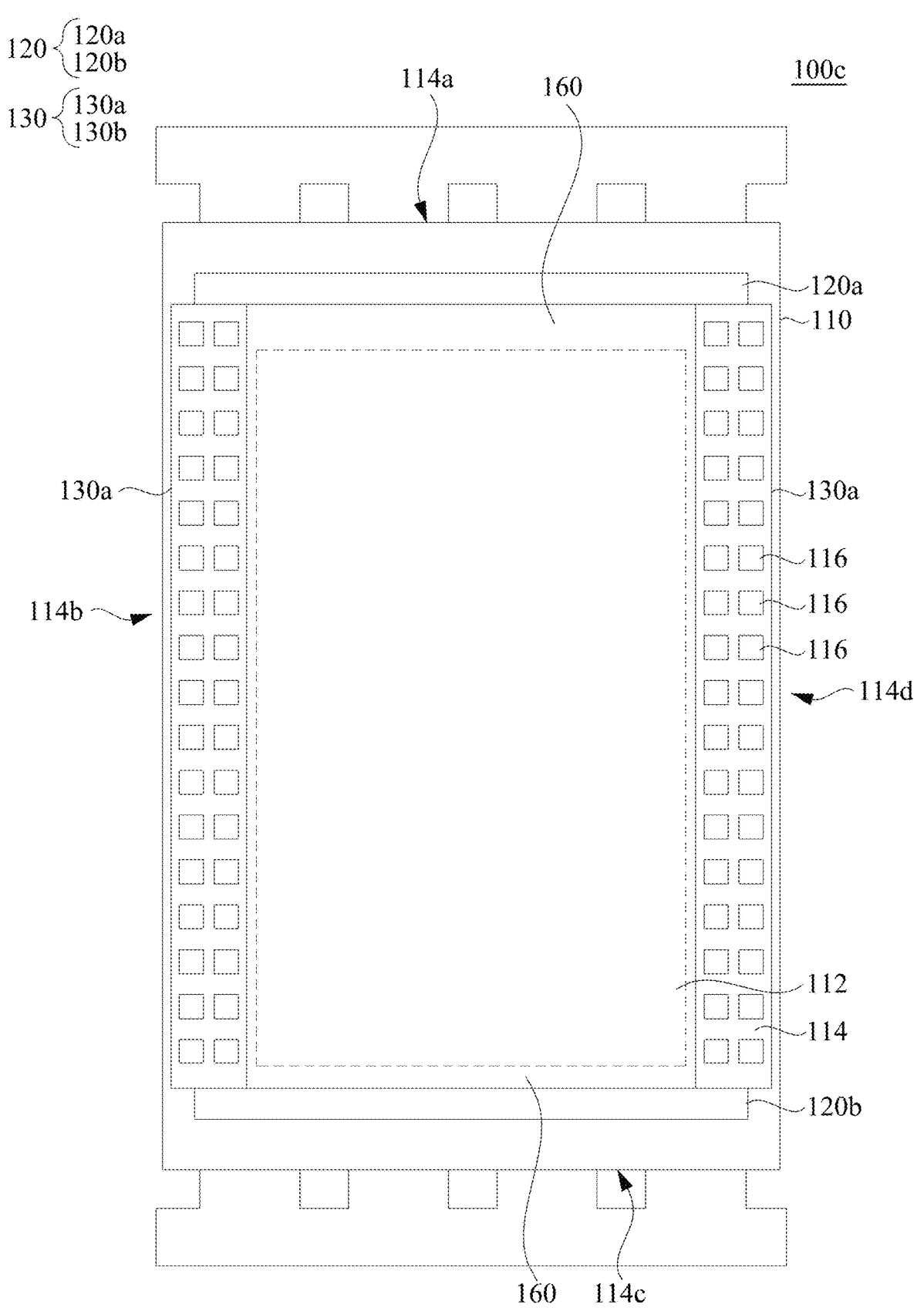
FIG. 11 is a top view of a display panel according to yet another embodiment of the present disclosure.

FIG. 11 is a top view of a display panel 100*c* according to yet another embodiment of the present disclosure. a display panel 100*c* includes a first substrate 110, a first sealing glue layer 120 and a second sealing glue layer 130. The first substrate 110 has a first display area 112 and a second display area 114, in which a plurality of light-emitting diodes (LEDs) 116 are disposed in the second display area 114. The second display area 114 surrounds the first display area 112 and has a first edge 114*a*, a second edge 114*b*, a third edge 114*c* and a fourth edge 114*d*. The difference between the present embodiment and the embodiment of FIG. 8 is that, in the present embodiment, the second sealing glue layer 130 of the display panel 100*c* has only the first portion 130*a* adjacent to the second edge 114*b* and the fourth edge 114*d*. There is the first portion 120*a* and the second portion 120*b* of the first sealing glue layer 120 adjacent to the first edge 114*a* and the third edge 114*c* respectively.

Figure 12:
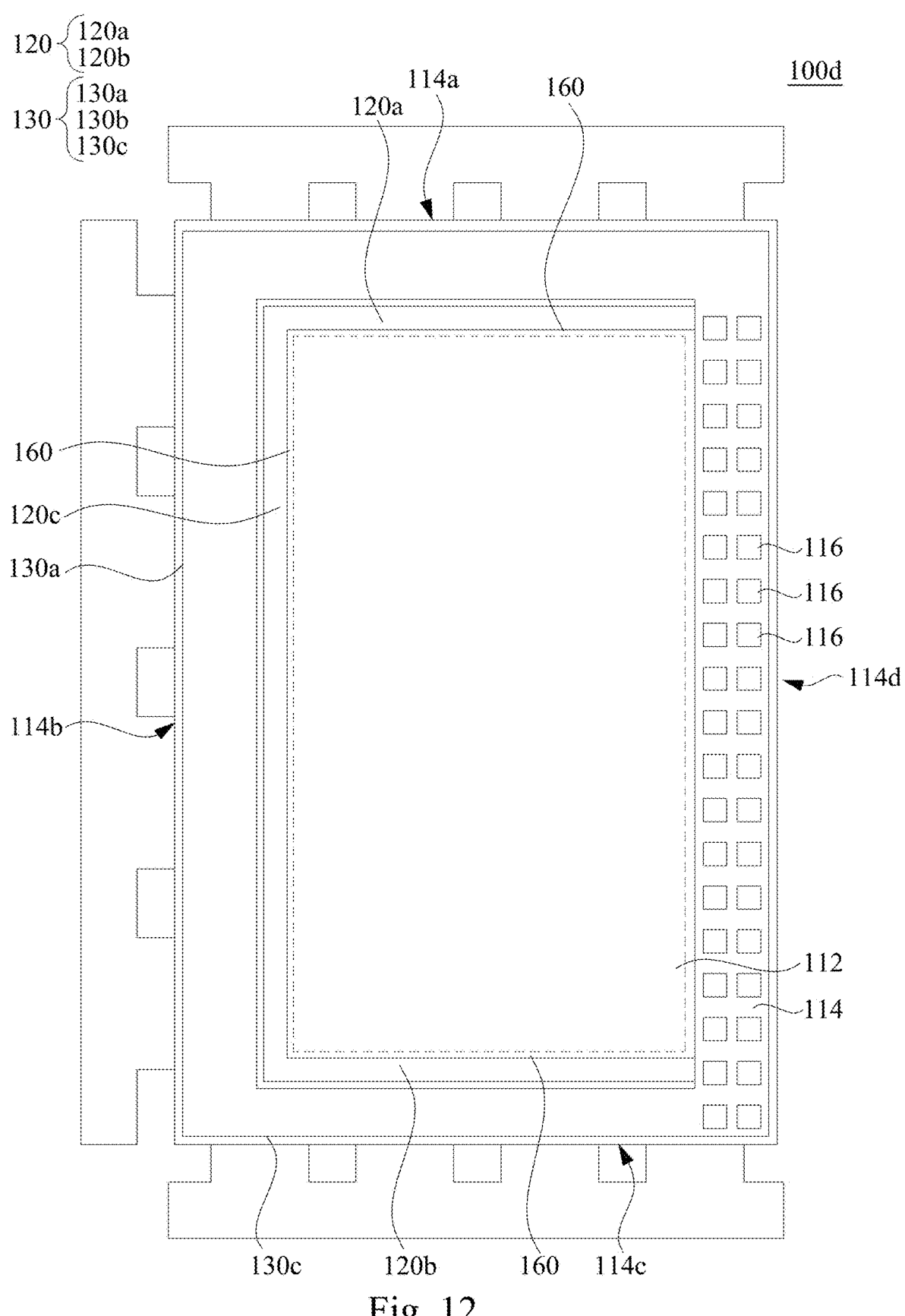
FIG. 12 is a top view of a display panel according to yet another embodiment of the present disclosure.

FIG. 12 is a top view of a display panel according to yet another embodiment of the present disclosure. a display panel 100*d* includes a first substrate 110, a first sealing glue layer 120 and a second sealing glue layer 130. The first substrate 110 has a first display area 112 and a second display area 114, in which a plurality of light-emitting diodes (LEDs) 116 are disposed in the second display area 114. The second display area 114 surrounds the first display area 112 and has a first edge 114*a*, a second edge 114*b*, a third edge 114*c* and a fourth edge 114*d*. The difference between the present embodiment and the embodiment of FIG. 8 is that, in the present embodiment, the first sealing glue layer 120 of the display panel 100*d* further includes a third portion 120*c* adjacent to the second edge 114*b*. Such design is suitable for the splicing of two display panels 100*d* since only one edge (such as the fourth edge 114*d*) needs to be spliced with another display panels 100*d*.

Figure 13:
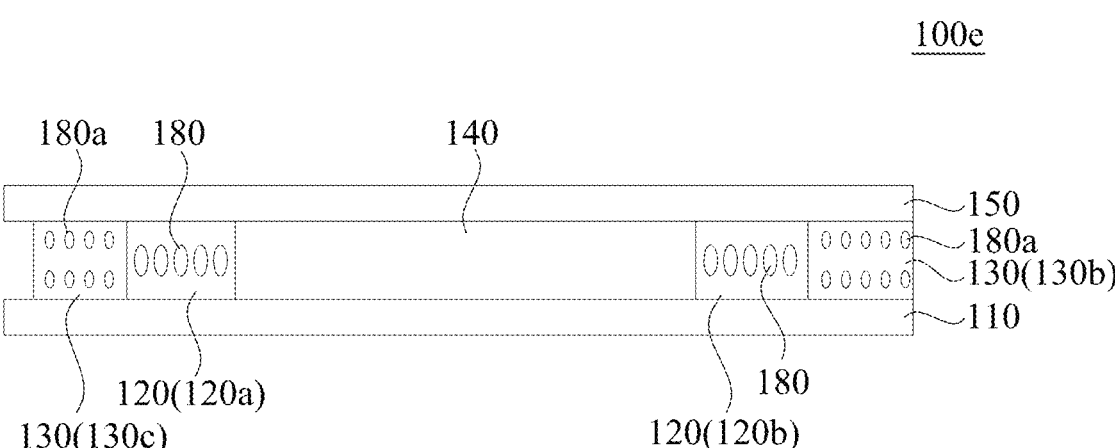
FIG. 13 is a cross-sectional view of a display panel according to yet another embodiment of the present disclosure.

FIG. 13 is a cross-sectional view of a display panel 100*e* according to yet another embodiment of the present disclosure. The difference between the present embodiment and the embodiment of FIG. 1 is that, in the present embodiment, the second sealing glue layer 130 of the display panel 100*e* includes fiber 180*a*, and a size of the fiber 180 of the first sealing glue layer 120 is greater than a size of the fiber 180*a* of the second sealing glue layer 130.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A display panel, comprising:
   a first substrate having a first display area and a second display area, wherein a plurality of light-emitting diodes (LEDs) are disposed in the second display area, the second display area surrounds the first display area and has a first edge, a second edge, a third edge and a fourth edge;
   a second substrate located on the first substrate;
   a first sealing glue layer located between the first substrate and the second substrate and in the second display area and having a first portion, wherein the first sealing glue layer comprises fibers, the first sealing glue layer is at least adjacent to the first edge, and the LEDs are free from coverage by the first sealing glue layer;

a second sealing glue layer located between the first substrate and the second substrate and in the second display area and having a first portion, wherein the second sealing glue layer covers the LEDs, and the second sealing glue layer is a different kind from the first sealing glue layer; and a liquid crystal layer located between the first substrate and the second substrate and surrounded by the first sealing glue layer and the second sealing glue layer.

2. The display panel of claim 1, wherein the second sealing glue layer further comprises a second portion adjacent to the first edge.

3. The display panel of claim 2, wherein the second portion of the second sealing glue layer is located at a side of the first sealing glue layer facing away the first display area.

4. The display panel of claim 2, wherein a height of the first portion of the first sealing glue layer is different from a height of the second portion of the second sealing glue layer.

5. The display panel of claim 2, wherein the second sealing glue layer further comprises a third portion adjacent to the third edge.

6. The display panel of claim 2, wherein the first sealing glue layer further comprises a second portion adjacent to the third edge.

7. The display panel of claim 6, wherein the second portion of the first sealing glue layer is located between the first display area and a third portion of the second sealing glue layer.

8. The display panel of claim 2, wherein the first sealing glue layer further comprises a third portion adjacent to the second edge or the fourth edge.

9. The display panel of claim 1, wherein the first sealing glue layer is adjacent to a bonding area.

10. The display panel of claim 1, wherein the second sealing glue layer comprises fibers, and a size of the fibers of the first sealing glue layer is greater than a size of the fibers of the second sealing glue layer.

11. A display panel, comprising:

a substrate having a first display area and a second display area, wherein a plurality of light-emitting diodes (LEDs) are disposed in the second display area, the second display area surrounds the first display area and has a first edge, a second edge, a third edge and a fourth edge;

a first sealing glue layer located on the substrate and in the second display area and having a first portion, wherein the first sealing glue layer comprises fibers, the first sealing glue layer is at least adjacent to the first edge, and the LEDs are free from coverage by the first sealing glue layer;

a second sealing glue layer located on the substrate and in the second display area and having a first portion, wherein the second sealing glue layer covers the LEDs, and the second sealing glue layer is a different kind from the first sealing glue layer;

a liquid crystal layer located on the substrate and surrounds by the first sealing glue layer and the second sealing glue layer; and a bonding area adjacent to the first edge of the substrate.

12. The display panel of claim 11, wherein the second sealing glue layer further comprises a second portion adjacent to the first edge.

13. The display panel of claim 12, wherein the second portion of the second sealing glue layer is located at a side of the first sealing glue layer facing away the first display area.

14. The display panel of claim 12, wherein a height of the first portion of the first sealing glue layer is different from a height of the second portion of the second sealing glue layer.

15. The display panel of claim 12, wherein the second sealing glue layer further comprises a third portion adjacent to the third edge.

* * * * *